United States Patent
Chang et al.

(10) Patent No.: US 10,975,946 B1
(45) Date of Patent: Apr. 13, 2021

(54) DIFFERENTIAL REDUCER WITH HIGH RATIO

(71) Applicant: Jaehyeock Chang, Seoul (KR)

(72) Inventors: Jaehyeock Chang, Seoul (KR); In Bae Chang, Seoul (KR)

(73) Assignee: Jaehyeock Chang, Seoul (KR)

( * ) Notice: Subject to any disclaimer, the term of this patent is extended or adjusted under 35 U.S.C. 154(b) by 0 days.

(21) Appl. No.: 16/922,499

(22) Filed: Jul. 7, 2020

(30) Foreign Application Priority Data

Nov. 13, 2019 (KR) .................. 10-2019-0144975

(51) Int. Cl.
| | |
|---|---|
| *F16H 1/28* | (2006.01) |
| *F16H 48/38* | (2012.01) |
| *H02K 7/116* | (2006.01) |
| *F16H 48/10* | (2012.01) |
| *F16H 48/06* | (2006.01) |
| *F16H 48/08* | (2006.01) |

(52) U.S. Cl.
CPC .............. *F16H 48/38* (2013.01); *F16H 1/28* (2013.01); *F16H 48/06* (2013.01); *F16H 48/08* (2013.01); *F16H 48/10* (2013.01); *H02K 7/116* (2013.01); *F16H 2001/2881* (2013.01); *H02K 2213/03* (2013.01)

(58) Field of Classification Search
None
See application file for complete search history.

(56) References Cited

U.S. PATENT DOCUMENTS

| | | | | |
|---|---|---|---|---|
| 3,453,906 A | * | 7/1969 | Ito ............... | F16H 1/46 475/342 |
| 3,675,510 A | * | 7/1972 | Duggar, Jr. ...... | F16H 1/46 475/342 |
| 4,850,247 A | * | 7/1989 | Yu ............... | F16H 1/46 475/342 |
| 4,864,893 A | * | 9/1989 | Hori ............. | F16H 1/46 475/341 |
| 5,242,336 A | * | 9/1993 | Hori ............. | F16H 1/46 475/220 |

(Continued)

FOREIGN PATENT DOCUMENTS

| | | |
|---|---|---|
| DE | 4026886 A1 | 2/1992 |
| DE | 212017000284 U1 | 9/2019 |

(Continued)

*Primary Examiner* — Timothy Hannon
(74) *Attorney, Agent, or Firm* — Novick, Kim & Lee, PLLC; Jae Youn Kim

(57) ABSTRACT

A high-ratio differential reducer is provided. A carrier is connected to an input shaft. At least one planetary gear is supported to be rotatably supported by the carrier in an eccentric state from the carrier. A fixed annular gear meshes with the planetary gear in a state of being coaxially arranged with the carrier. A rotating annular gear meshes with the planetary gear in a state of being coaxially arranged with the fixed annular gear and has the number of teeth set by Equation below:

$$Z_o = Z_f \pm N_p \quad (1),$$

where $Z_o$ is the number of teeth of the rotating annular gear, $Z_f$ is the number of teeth of the fixed annular gear, and $N_p$ is the number of planetary gears.

6 Claims, 11 Drawing Sheets

(56) References Cited

U.S. PATENT DOCUMENTS

| | | | |
|---|---|---|---|
| 6,033,336 A * | 3/2000 | Bae | F16H 1/46 475/341 |
| 6,123,640 A * | 9/2000 | Schulz | F16H 1/46 475/341 |
| 6,348,022 B1 * | 2/2002 | Jin | F16H 1/28 475/342 |
| 6,585,620 B1 | 7/2003 | Bae | |
| 8,834,316 B2 * | 9/2014 | Berg | F16H 1/28 475/341 |
| 2019/0390736 A1 * | 12/2019 | Dai | F16H 37/041 |
| 2020/0309235 A1 | 1/2020 | Fujimoto et al. | |

FOREIGN PATENT DOCUMENTS

| | | |
|---|---|---|
| EP | 3467345 A1 | 4/2019 |
| JP | 2003-185018 A | 7/2003 |
| JP | 2017-040348 A | 2/2017 |
| JP | 2018-009638 A | 1/2018 |
| KR | 20-0398945 Y1 | 10/2005 |
| KR | 10-2016-0126473 A | 11/2016 |
| WO | 0071910 A1 | 11/2000 |

* cited by examiner

DIFFERENTIAL REDUCER WITH HIGH RATIO

CROSS-REFERENCE TO RELATED APPLICATION(S)

This application claims the benefit under 35 USC § 119(a) of Korean Patent Application No. 10-2019-0144975, filed on Nov. 13, 2019, in the Korean Intellectual Property Office, the entire disclosure of which is incorporated herein by reference for all purposes.

BACKGROUND

1. Field

The following description relates to a high-ratio differential reducer, and more particularly, to a reducer capable of outputting a high torque by decelerating a rotational motion input from an input device, such as a motor, to a high ratio by a differential method.

2. Description of Related Art

Motors that generate power using electricity have high energy efficiency characteristics and can generate high-speed rotational motion. In addition, motors are easy to control and relatively simple to configure, so they are widely applied as actuators in the robot field. However, since motors, in general, do not have high force/torque density, in order to be applied to many industrial robots requiring large torque, a separate mechanism for increasing output torque is required. In this case, gear reducers, which are mechanical devices that increase the force/torque density by trading off rotation speed, are mainly used.

In the case of speed reduction using spur gears based on involute curves, the ratio of one-stage speed reduction is limited to a maximum of about 1:10 to avoid undercut due to tooth interference. Therefore, multi-stage speed reduction is required for a high speed-reduction ratio of around 1:100 required by industrial robots and the like, and the reducers must be designed in consideration of various problems that may arise, such as increased structure complexity and misalignment of input and output shafts. A typical reducer that realizes a high speed-reduction ratio while placing an input shaft and an output shaft on the same line includes a planetary gear train and a harmonic drive.

The planetary gear train includes a sun gear connected to a motor shaft, a plurality of planetary gears meshing with the sun gear, a carrier supporting the planetary gears and acting as an output shaft, and an annular gear meshing with the planetary gears. The planetary gear train is a two-degree-of-freedom device. In general, in the case of being used for deceleration, when a rotational motion is applied to the sun gear while the annular gear is fixed, amplified torque is output from the carrier that rotates at a slow speed.

The planetary gear train has advantages of being capable of transmitting a large torque due to its large tooth module and of relatively simple structure, low manufacturing cost, and high durability and reliability. However, in the planetary gear train, a speed-reduction ratio is limited to approximately 10:1 or less because the speed-reduction ratio is determined by pitch circle diameters of the sun gear and the annular gear. For a higher speed-reduction ratio, the planetary gear train must have multiple stages at the expense of increase in weight and volume.

The harmonic drive consists of an elliptical bearing called a wave generator, an elastic cup called a flexspline, and an annular gear called a circular spline. When the flexspline is deformed into an elliptical shape by the wave generator, teeth of the gear formed on the outer surface of the flexspline mesh with two teeth of the circular spline. Since the number of gear teeth of the flex spline and the number of gear teeth of the circular spline differ by 2n (n: positive integer), the flexspline moves 2n pitches for each rotation of the wave generator. At this time, if the number of gear teeth of the flexspline is Z, the reduction ratio is Z:2n, and a high ratio deceleration of tens to hundreds:1 is realized.

Harmonic drives are widely used in the industrial machinery market that requires small, lightweight, high-power drive mechanism, such as robots, because of the small number of components and the great advantage of high-ratio deceleration. However, the harmonic drives have a problem of fatigue fracture due to elastic deformation of the flex spline, and a price problem due to an expensive wave generator.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

An object of the present invention is to provide a high-ratio differential reducer that can be structurally simplified while achieving a relatively high speed-reduction ratio and can improve durability while reducing manufacturing cost.

To achieve the object of the present invention, the present invention provides a high-ratio differential reducer including a carrier, at least one planetary gear, a fixed annular gear, and a rotating annular gear. The carrier may be connected to an input shaft. The at least one planetary gear may be rotatably supported by the carrier in an eccentric state from the carrier. The fixed annular gear may mesh with the planetary gear in a state of being coaxially arranged with the carrier. The rotating annular gear may mesh with the planetary gear in a state of being coaxially arranged with the fixed annular gear and have the number of teeth that is set by Equation 1 below:

$$Z_o = Z_f \pm N_p \quad (1),$$

where $Z_o$ is the number of teeth of the rotating annular gear, $Z_f$ is the number of teeth of the fixed annular gear, and $N_p$ is the number of planetary gears.

According to the present invention, it is possible to realize a high speed-reduction ratio in the range of several tens:1 to several hundred:1 only with a single stage configuration without a sun gear required in the conventional planetary gear train, thereby achieving a simplified structure, compared to the conventional planetary gear train.

In addition, according to the present invention, it is possible to solve a problem of fatigue fracture due to elastic deformation of a flexspline occurring in the conventional harmonic drive, and also solve the price problem due to an expensive wave generator, thereby improving durability and reducing manufacturing cost.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The invention is described more fully hereinafter with reference to the accompanying drawings, in which exemplary embodiments of the invention are shown. Herein, the same drawing reference numerals are understood to refer to the same elements, and a detailed description of known functions and configurations incorporated herein will be omitted when it may obscure the subject matter with unnecessary detail. These embodiments are provided so that this disclosure will be thorough and complete, and will fully convey the concept of the invention to those skilled in the art. In the drawings, the size and relative sizes of layers and regions may be exaggerated for clarity.

Figure 1:
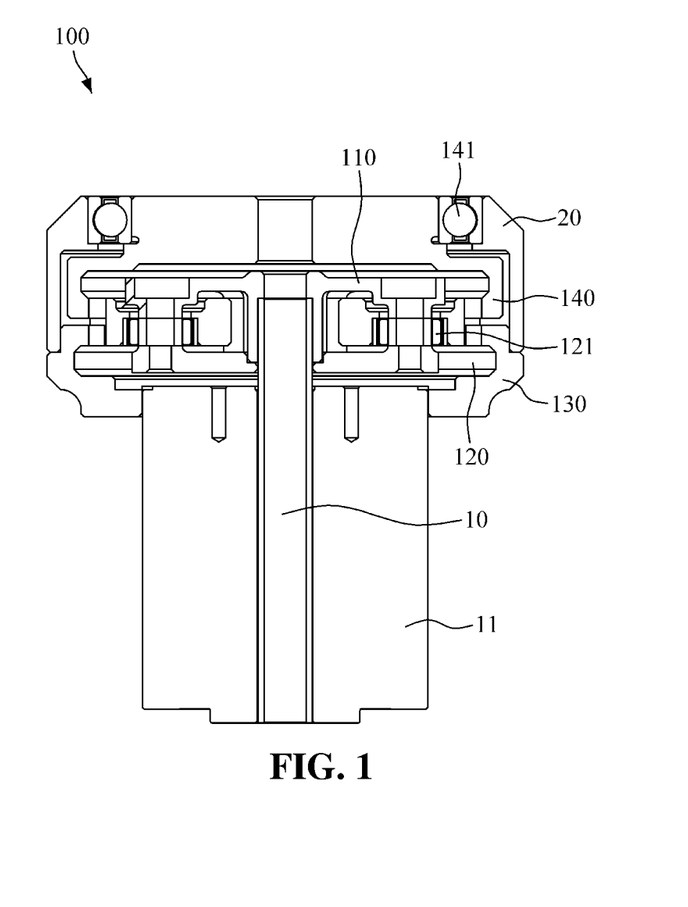
FIG. 1 is a cross-sectional view of a high-ratio differential reducer according to one embodiment of the present invention.
Figure 2:
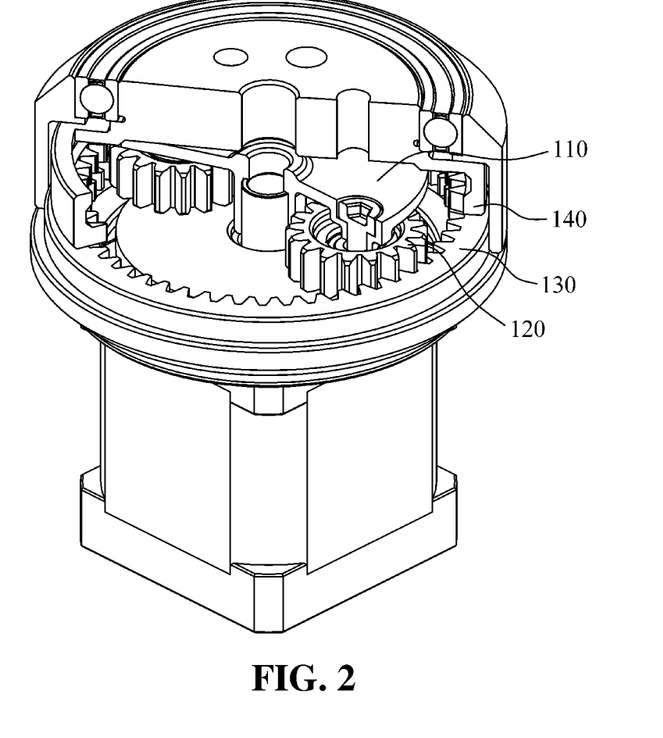
FIG. 2 is a perspective view of a portion of the high-ratio differential reducer illustrated in FIG. 1.
Figure 3:
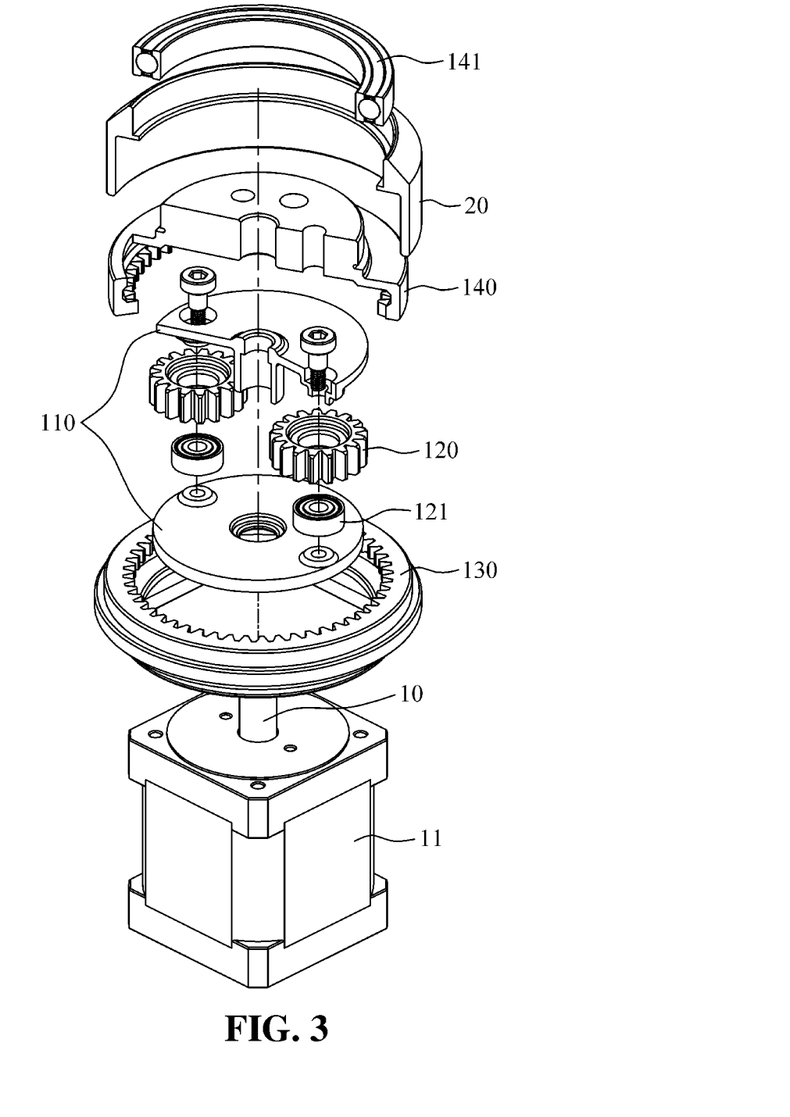
FIG. 3 is an exploded perspective view of FIG. 2.

FIG. 1 is a cross-sectional view of a high-ratio differential reducer according to one embodiment of the present invention. FIG. 2 is a perspective view of a portion of the high-ratio differential reducer illustrated in FIG. 1. FIG. 3 is an exploded perspective view of FIG. 2.

Referring to FIGS. 1 to 3, the high-ratio differential reducer 100 according to one embodiment of the present invention includes a carrier 110, at least one planetary gear 120, a fixed annular gear 130, and a rotating annular gear 140.

The carrier 110 is connected to an input shaft 10. The carrier 110 may be rotated by a rotational motion input from the input shaft 10. The input shaft 10 may correspond to a drive shaft of a rotary motor 11. The drive shaft of the rotary motor may be connected to the center of rotation of the carrier 110. The carrier 110 rotatably supports a planetary gear 120 in an eccentric region, and revolves the planetary gear 120 as the carrier 110 rotates.

The planetary gear 120 is supported on the carrier 110 by a bearing 121 in an eccentric state from the carrier 110. The planetary gear 120 may rotate with respect to the carrier 110 while revolving when the carrier 110 rotates. The planetary gear 120 commonly mesh with the fixed annular gear 130 and the rotating annular gear 140. The planetary gear 120 may be composed of a spur gear.

Two planetary gears 120 may be provided to form a pair. The planetary gears 120 are arranged at equal intervals from the center of rotation of the carrier 110. Each rotation center of the planetary gears 120 may be located at a point symmetrical to the radius of rotation of the carrier 110. The number of teeth of the planetary gear 120 is set to be smaller than the number of teeth of each of the fixed annular gear 130 and the rotating annular gear 140. It is illustrated that two planetary gears 120 are provided, but one or three or more planetary gears may be provided.

The fixed annular gear 130 meshes with the planetary gear 120 in a state of being coaxially arranged with the carrier 110. The fixed annular gear 130 causes the planetary gear 120, which revolves, to rotate when the carrier 110 rotates. When the planetary gear 120 is composed of a spur gear, the fixed annular gear 130 may be composed of a spur gear and mesh with the planetary gear 120. The fixed annular gear 130 may be fixed to a fixing frame 20 to maintain its position.

The rotating annular gear 140 meshes with the planetary gear 120 in a state of being coaxially arranged with the fixed annular gear 130. The rotating annular gear 140 serves as an output shaft. The rotating annular gear 140 may rotate as the planetary gear 120 rotates, as well as revolves, when the carrier 110 rotates, thereby decelerating and outputting the rotational motion input to the carrier 110. The rotating annular gear 140 may be rotatably supported by a bearing 141. When the planetary gear 120 is composed of a spur gear, the rotating annular gear 140 may be composed of a spur gear and mesh with the planetary gear 120. Meanwhile, in another example, the planetary gear 120, the fixed annular gear 130, and the rotating annular gear 140 may each be composed of a helical gear.

The number of teeth of the rotating annual gear 140 is set by Equation 1 below.

$$Z_o = Z_f \pm N_p \quad (1)$$

Here, $Z_o$ is the number of teeth of the rotating annular gear, $Z_f$ is the number of teeth of the fixed annular gear, and $N_p$ is the number of planetary gears.

According to Equation 1 above, when there is one planetary gear 120, the number of teeth of the rotating annular gear 140 is set to be one more or one less than the number of teeth of the fixed annular gear 130. If the number of teeth of the rotating annular gear 140 is one more than the number of teeth of the fixed annular gear 130, the rotating annular gear 140 advances in the same direction as the revolving direction of the planetary gear 120 by one pitch than the fixed annular gear 130 when the planetary gear 120 rotates one turn. If the number of teeth of the rotating annular gear 140 is one less than the number of teeth of the fixed annular gear 130, the rotating annular gear 140 advances in a direction opposite to the revolving direction of the planetary gear 120 by one pitch than the fixed annular gear 130 when the planetary gear 120 rotates one turn.

Therefore, in the case where the number of teeth of the fixed annular gear 130 is $Z_f$, when the planetary gear 120 revolves by the number of teeth of the fixed annular gear 130, the rotating annular gear 140 rotates one turn, and hence a speed-reduction ratio is $Z_f$:1. In the case where there are two planetary gears 120, the number of teeth of the rotating annular gear 140 is set to be two more or two less than the number of teeth of the fixed annular gear 130. Then, according to the aforementioned principle, the speed-reduction ratio is $Z_f/2$:1. Similarly, in the case where there are $N_p$ planetary gears 120, the speed-reduction ratio is $Z_f/N_p$:1.

According to the high-ratio differential reducer 100 described above, the fixed annular gear 130 and the rotating annular gear 140 are coaxially arranged while they have a difference in the number of teeth equal to the number of planetary gears 120, and the planetary gears 120 of a single shape are configured to simultaneously mesh with the fixed annular gear 130 and the rotating annular gear 140 and rotate, thereby realizing a high speed-reduction ratio in the range of several tens:1 to several hundred:1.

As described above, the high-ratio differential reducer 100 according to the present embodiment can realize a high speed-reduction ratio in the range of several tens:1 to several hundred:1 only with a one-stage configuration, without a sun gear required in the conventional planetary gear train, and thus can be structurally simplified compared to the conventional planetary gear train.

In addition, the high-ratio differential reducer 100 of the present embodiment may solve the problem of fatigue fracture due to elastic deformation of a flexspline occurring in the conventional harmonic drive, and also solve the price problem due to an expensive wave generator, thereby improving durability and reducing manufacturing cost.

Meanwhile, the rotating annular gear 140 may have a tooth profile corrected so as to be simultaneously meshed with the fixed annular gear 130 having a different number of teeth and the planetary gear 120. The correction of tooth profile of the rotating annular gear 140 may be performed by setting a module, a pressure angle, and a profile shift coefficient. In this case, the module and the pressure angle of the fixed annular gear 130 may be set to be the same as the module and the pressure angle of the planetary gear 120.

The module and the pressure angle of the rotating annular gear 140 may be obtained by Equations 2 and 3 below. The derivation process of Equations 2 and 3 will be described further below.

$$m_o = m_s \left( \frac{Z_f - Z_p}{Z_o - Z_p} \right) \tag{2}$$

Here, $m_o$ is a module of the rotating annular gear, $m_s$ is a module of the fixed annular gear, and $Z_p$ is the number of teeth of the planetary gear.

$$\alpha_o = a\cos\left( \frac{Z_o - Z_p}{Z_f - Z_p} \cos\alpha_s \right) \tag{3}$$

Here, $\alpha_o$ is a pressure angle of the rotating annular gear, and $\alpha_s$ is a pressure angle of the fixed annular gear.

Meanwhile, the planetary gear 120 has the same module $m_s$ and pressure angle $\alpha_s$, as the module $m_s$ and pressure angle $\alpha_s$ of the fixed annular gear 130. However, the planetary gear 120 may be interpreted as having a module of $m_o$, a pressure angle of $\alpha_o$, and a profile shift coefficient of $x_p$ in relation to the rotating annular gear 140, which will be described below in conjunction with the derivation process of Equation 4 below.

As described above, under conditions in which the module, the pressure angle, and the profile shift coefficient of the planetary gear 120 are $m_o$, $\alpha_o$, and $x_p$, respectively, the profile shift coefficient $x_p$ of the planetary gear 120 may be obtained by Equation 4 below.

$$x_p = \frac{Z_p}{2\tan(\alpha_o)} (inv\alpha_s - inv\alpha_o) \tag{4}$$

Here, $inv\alpha_s = \tan\alpha_s - \alpha_s$ and $inv\alpha_o = \tan\alpha_o - \alpha_o$.

In addition, the profile shift coefficient of the rotating annular gear 140 may be obtained by substituting the module and the pressure angle of the rotating annular gear, the profile shift coefficient of the planetary gear, and the preset normal backlash into Equation 5 below, under conditions in which working pressure angle of the rotating annular gear and the planetary gear is equal to the pressure angle of the rotating annular gear. The derivation process of Equation 5 below will be described further below.

$$x_o = -\frac{f_n}{2m_o \sin\alpha_o} - x_p \tag{5}$$

Here, $x_o$ is the profile shift coefficient of the rotating annular gear and $f_n$ is the normal backlash.

For example, when the normal backlash is set to zero, the profile shift coefficient $x_o$ of the rotating annular gear 140 may be set to be equal to the absolute value of the profile shift coefficient $x_p$ of the planetary gear 120 by Equation 5 above. Generally, when the normal backlash is too small, sensitivity to factors, such as manufacturing dimensional error of the gear, center distance fluctuation of gear shaft, thermal expansion, lubricant film thickness change, gear tooth deformation, and the like, may occur, and when the normal backlash is too large, noise and vibration may occur. Therefore, the profile shift coefficient $x_o$ of the rotating annular gear 140 may be set to reflect an appropriate level of normal backlash.

Hereinafter, each derivation process of Equations 2 to 5 and the basis for interpretation of the planetary gear will be described.

The derivation process of Equations 2 and 3 is as follows.

Figure 4:
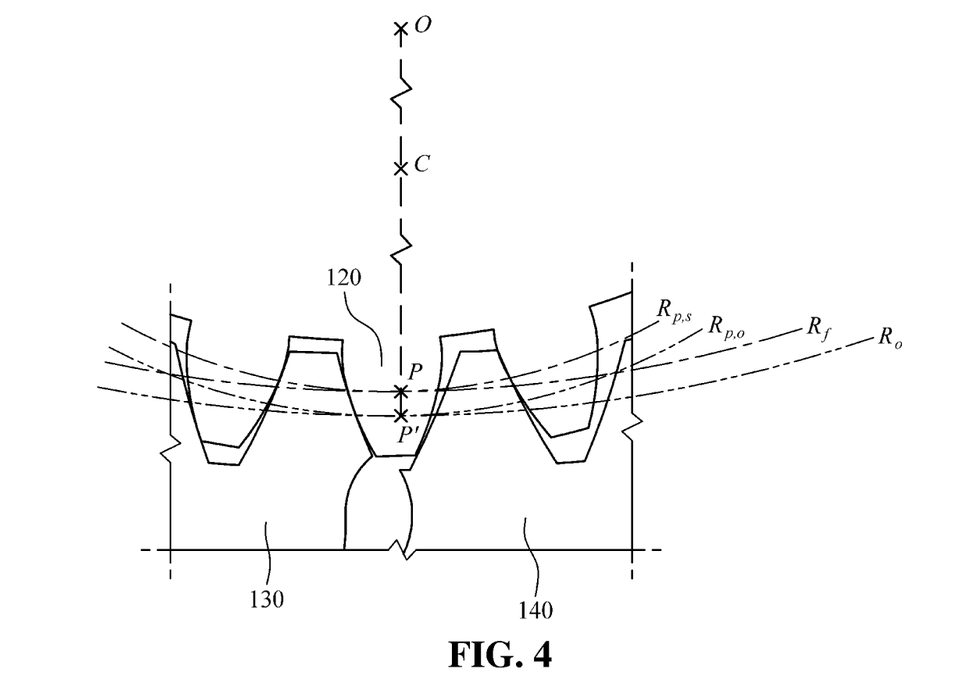
FIG. 4 is a view for describing a process of deriving a mathematical formula for obtaining a module and a pressure angle of a rotating annular gear.

In order to determine the module $m_o$ and the pressure angle $\alpha_o$ of the rotating annular gear 140, it is necessary to consider the position of the central axis of the planetary gear 120. Pitch circles of the fixed annular gear 130 and the planetary gear 120 have point O and point C as the central axis, respectively, have radius of $R_f$ and $R_{p,s}$, respectively, and touch each other at pitch point P, as shown in FIG. 4. Thus, a distance $\overline{OC}$ between the central axis O of the fixed annular gear 130 and the central axis C of the planetary gear 120 is obtained by Equation 6 below, using the relationship between the pitch circles.

$$\overline{OC} = \overline{OP} - \overline{CP} = R_f - R_{p,s} = \frac{m_s(Z_f - Z_p)}{2} \tag{6}$$

To use the central axis distance relationship between the rotating annular gear 140 and the planetary gear 120, it is assumed that the planetary gear 120 has a module of $m_o$, a pressure angle of $\alpha_o$, and a profile shift coefficient of $x_p$. In a similar manner, pitch circles of the rotating annular gear 140 and the planetary gear 120 have point O and point C as the central axis, respectively, have radius of $R_o$ and $R_{p,o}$, respectively, and touch at pitch point P'. Based on this relationship, the central axis distance $\overline{OC}$ is obtained by Equation 7 below.

$$\overline{OC} = \overline{OP'} - \overline{CP'} = R_o - R_{p,o} = \frac{m_o(Z_o - Z_p)}{2} \tag{7}$$

The central axes of the rotating annular gear 140 and the fixed annular gear 130 are located on the same axis, and the central axis distances $\overline{OC}$ are equal to each other because the planetary gear 120 of a single shape simultaneously meshes with the rotating annular gear 140 and the fixed annular gear 130. Accordingly, Equation 8 below is derived.

$$\overline{OP} - \overline{CP} = \overline{OP'} - \overline{CP'} \tag{8}$$

Using the relationship in Equation 8 above, Equation 2 for obtaining the module $m_o$ of the rotating annular gear 140 is derived.

In addition, when the normal pitch length of the fixed annular gear 130 is different from the normal pitch length of the rotating annular gear 140, it is apprehended that backlash may increase and vibration may occur due to impact during power transmission. Therefore, the normal pitch length of the fixed annular gear 130 may be set to equal to the normal pitch length of the rotating annular gear 140. In this case, the relationship between the module $m_s$ and the pressure angle $\alpha_s$ of the fixed annular gear 130 and the module $m_o$ and the pressure angle $\alpha_o$ of the rotating annular gear 140 is expressed by Equation 9 below. According to Equation 8 and Equation 9, Equation 3 for obtaining the pressure angle $\alpha_o$ of the rotating annular gear 140 is derived.

$$\pi m_s \cos \alpha_s = \pi m_o \cos \alpha_o \tag{9}$$

Figure 5:
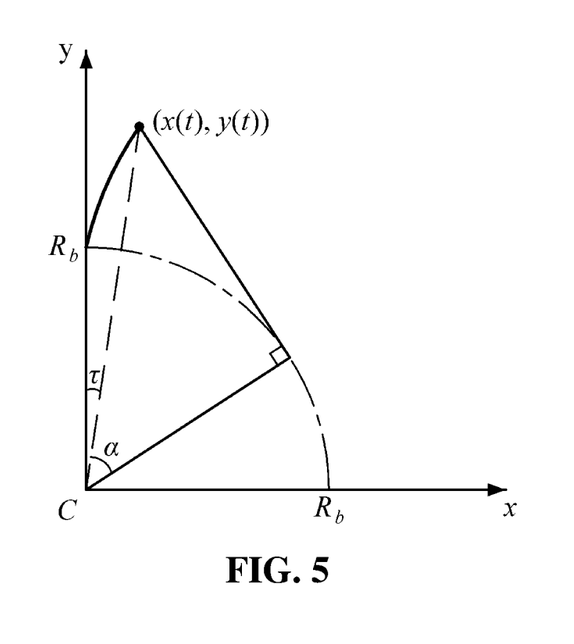
FIG. 5 is a view for describing the basis of interpretation of a planetary gear.

Meanwhile, the basis on which the planetary gear 120 is interpreted as having a module of $m_o$, a pressure angle of $\alpha_o$, and a profile shift coefficient of $x_p$ in relation to the rotating annular gear 140 is as follows.

An involute curve of a gear having the origin point C as a center of rotation, a base circle $R_b$, and a pressure angle $\alpha$ is defined by Equation 10 below in the coordinate plane of FIG. 5.

$$x(t) = R_b(\sin t - t \cos t),$$

$$y(t) = R_b(\cos t - t \sin t) \tag{10}$$

Here, $t = \tau + \alpha = \tan \alpha$ and $\alpha \geq 0$.

The involute curve of base circle of radius of $R_b$ is a circle according to Equation 10, starting from $(O, R_b)$, as shown in FIG. 5. Assuming that two planetary gears $P_s$ and $P_o$ each having $Z_p$ teeth are provided, the radii of base circles of $P_s$ and $P_o$ are $m_s Z_p \cos \alpha_s / 2$ and $m_o Z_p \cos \alpha_o / 2$, respectively. Thus, according to Equation 9, the radii of base circles of $P_s$ and $P_o$ are equal to each other. That is, $P_s$ and $P_o$ having the same base circle form a tooth profile by the same involute curve.

Generally, the tooth width of a gear tooth profile is determined by a module, a profile shift coefficient, and a pressure angle of the gear. The tooth width of $P_s$ on a circumference at an arbitrary distance of $R_t$ from the center is defined as $T_s$ and the tooth width of $P_o$ is defined as $T_o$. $m_s$ and $\alpha_s$ have been already determined and $m_o$ and $\alpha_o$ are set to satisfy Equation 9. $P_o$ is shifted by $x_p$ so that $T_s$ and $T_o$ are equal to each other.

Since the planetary gear meshing with the fixed annular gear and the planetary gear meshing with the rotating annular gear have the same tooth profile curve and the same tooth width, if the diameters of the addendum circle and the dedendum circle are made equal to each other by adjusting only the tooth height, $P_s$ and $P_o$ can be planetary gears of the same shape.

Accordingly, the planetary gears of a single shape may rotate by simultaneously meshing with the fixed annular gear and the rotating annular gear which have the same diameters of the addendum circle and the dedendum circle and have a different number of teeth. That is, the planetary gear $P_s$ having a module of $m_s$ and a pressure angle of $\alpha_s$ may be interpreted as a planetary gear $P_o$ having a module of $m_o$, a pressure angle of $\alpha_o$, and a profile shift coefficient of $x_p$.

Meanwhile, the derivation process of Equation 4 is as follows.

Figure 6:
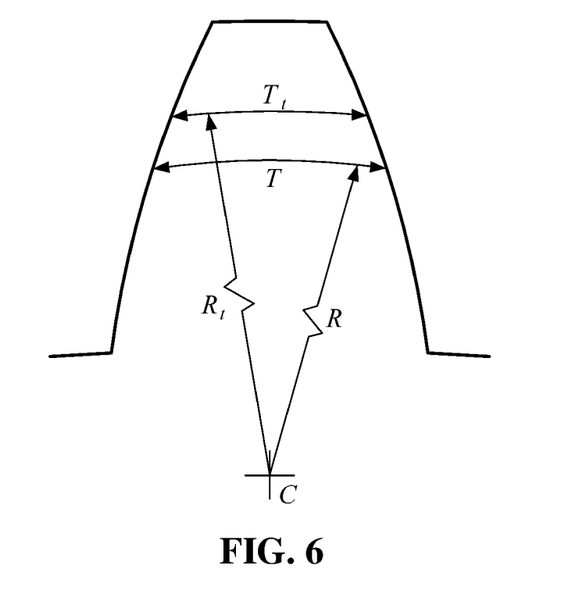
FIGS. 6 and 7 are diagrams for describing a process for deriving a mathematical formula for obtaining a profile shift coefficient of a rotating annular gear.
Figure 7:
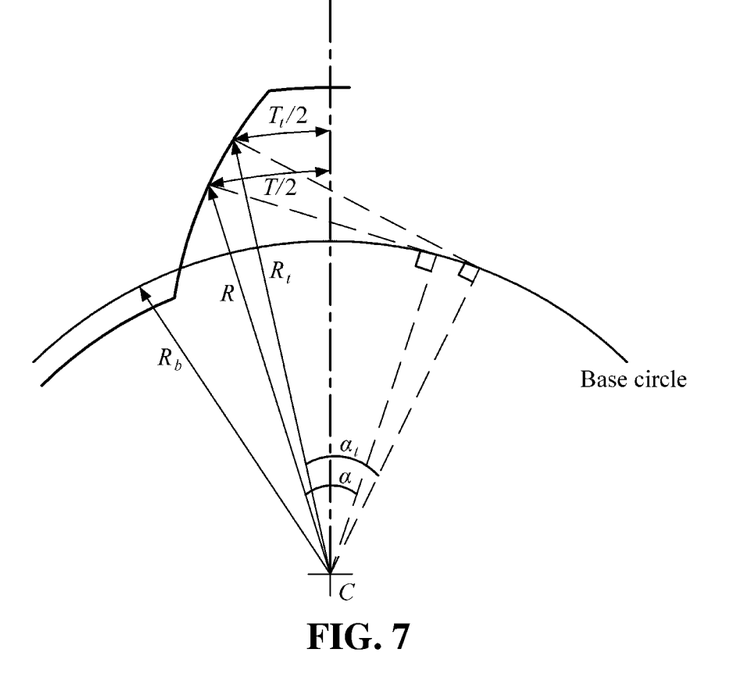

When an involute gear having a pitch circle of radius of R, a tooth width of T on a pitch circumference, and a pressure angle of $\alpha$ is given, the width shape $T_t$ on the circumference of radius of $R_t$ from the center of the gear may be obtained by Equation 11 below in FIGS. 6 and 7.

$$T_t = 2R_t \left( \frac{T}{2R} + \operatorname{inv}\alpha - \operatorname{inv}\alpha_t \right) \tag{11}$$

Here, when the radius of base circle of the gear is $R_b$, $\alpha_t$ is obtained by Equation 12 below.

$$\alpha_t = a\cos\left(\frac{R_b}{R_t}\right) \tag{12}$$

The tooth widths on the circumferences of a radius of a random value $R_t$ from the centers of the planetary gears $P_s$ and $P_o$ having basic circles of the same size of $R_b$ are defined as $T_s$ and $T_o$, respectively. By adopting the form of Equation 11, $T_s$ and $T_o$ are expressed by Equations 13 and 14, respectively.

$$T_s = 2R_t \left( \frac{T_{s,p}}{2R_{s,p}} + \operatorname{inv}\alpha_s - \operatorname{inv}\alpha_t \right) \tag{13}$$

$$T_o = 2R_t \left( \frac{T_{o,p}}{2R_{o,p}} + \operatorname{inv}\alpha_o - \operatorname{inv}\alpha_t \right) \tag{14}$$

Here, $R_{s,p}$ is a pitch circle diameter of the planetary gear $P_s$, $T_{s,p}$ is a tooth width on the pitch circumference of the planetary gear $P_s$, $R_{o,p}$ is a pitch circle diameter of the planetary gear $P_o$, and $T_{o,p}$ is the tooth width on the pitch circumference of the planetary gear $P_o$. When Equation 14 is subtracted from Equation 13, Equation 15 for a difference in tooth profile between $P_s$ and $P_o$ on the circumference of a radius of $R_t$ from the center is derived as shown below.

$$T_\alpha - T_o = 2R_t \left( \frac{T_{s,p}}{2R_{s,p}} - \frac{T_{o,p}}{2R_{o,p}} + \operatorname{inv}\alpha_s - \operatorname{inv}\alpha_o \right) \tag{15}$$

Referring to Equation 15, when the expression in parentheses on the right side becomes 0, $T_s$ and $T_o$ are the same regardless of $R_t$. The condition by which the expression in parentheses on the right side becomes 0 may be expressed by Equation 16 below.

$$\frac{T_{s,p}}{2R_{s,p}} - \frac{T_{o,p}}{2R_{o,p}} + \operatorname{inv}\alpha_s - \operatorname{inv}\alpha_o = 0 \tag{16}$$

That is, when the condition of Equation 16 is satisfied, the tooth profiles and tooth widths of the planetary gears $P_s$ and $P_o$ coincide in all sections in which $R_t$ is defined. $R_{s,p}$ and $T_{s,p}$ in the planetary gear $P_s$ and $R_{o,p}$ and $T_{o,p}$ in the planetary gear $P_o$ are expressed by Equation 17 below. Equation 4 for obtaining the amount of profile shift coefficient $x_p$ is derived by substituting Equation 17 into Equation 16.

$$R_{s,p} = \frac{m_s Z_p}{2}, \quad T_{s,p} = \frac{\pi}{2} m_s \qquad (17)$$
$$R_{o,p} = \frac{m_o Z_p}{2}, \quad T_{o,p} = \left(\frac{\pi}{2} + 2 x_p \tan\alpha_o\right) m_o$$

Meanwhile, the derivation process of Equation 5 is as follows.

In general, the normal backlash $f_n$ of profile shifted gear pair with profile shift coefficients of $x_o$ and $x_p$, a module of $m_o$, and a cutter pressure angle of $\alpha_o$ is defined as Equation 18 below. In Equation 18, when the working pressure angle $\alpha_w$ of the rotating annular gear and the planetary gear is set to be equal to the pressure angle $\alpha_o$ of the rotating annular gear, Equation 5 for obtaining the profile shift coefficient $x_o$ of the rotating annular gear is derived.

$$f_n = \left\{ inv(\alpha_w) - 2\frac{x_p + x_o}{Z_p + Z_o}\tan\alpha_o - inv(\alpha_o) \right\} m_o(Z_p + Z_o)\cos\alpha_o \qquad (18)$$

Figure 8:
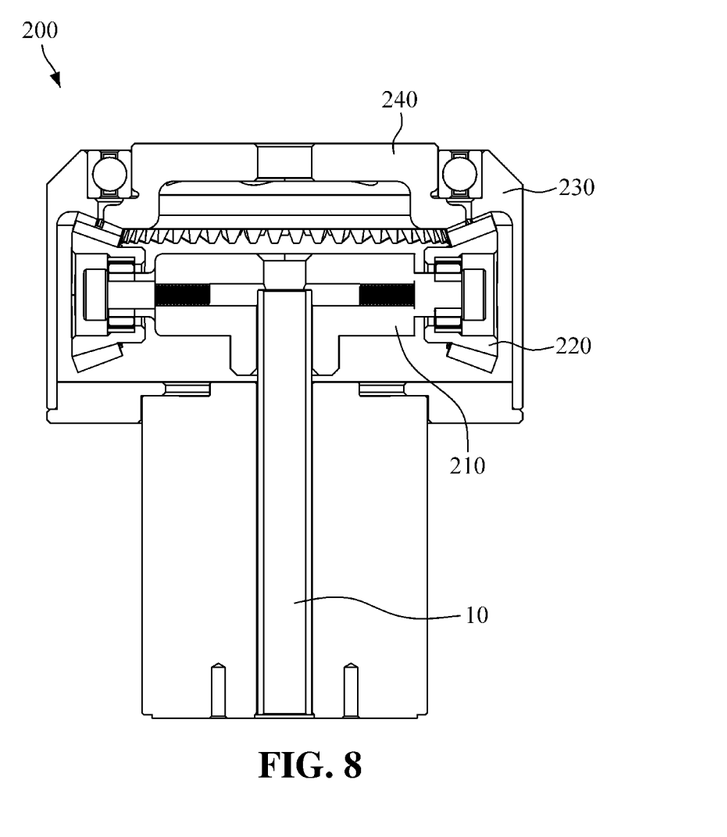
FIG. 8 is a cross-sectional view of a high-ratio differential reducer according to another embodiment of the present invention.
Figure 9:
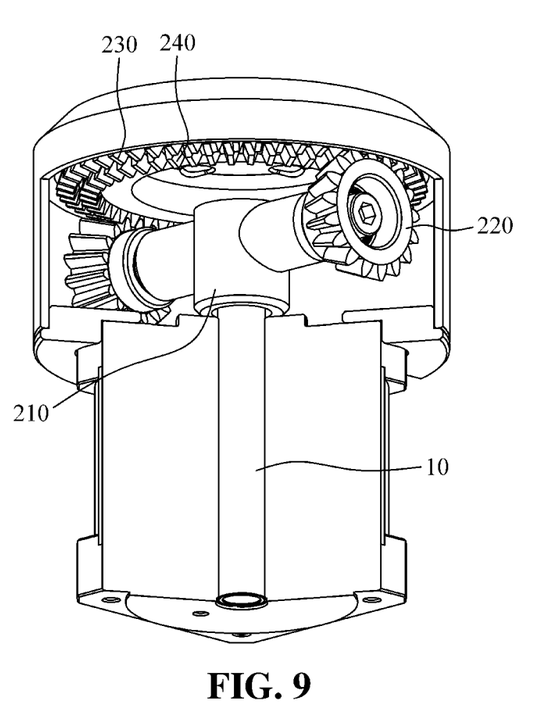
FIG. 9 is a perspective view of FIG. 8.

FIG. 8 is a cross-sectional view of a high-ratio differential reducer according to another embodiment of the present invention. FIG. 9 is a perspective view of FIG. 8.

Referring to FIGS. 8 and 9, in the high-ratio differential reducer 200 according to another embodiment of the present invention, a planetary gear 220, a fixed annular gear 230, and a rotating annular gear 240 may each be composed of a bevel gear.

An axis of rotation of the planetary gear 220 is arranged in perpendicular to an input shaft 10 of a carrier 210. The fixed annular gear 230 and the rotating annular gear 240 are coaxially arranged with the carrier 210. The fixed annular gear 230 and the rotating annular gear 240 are made simultaneously mesh with the planetary gear 220 in a state in which they are arranged in a concentric circle. Here, the tooth profile of the rotating annular gear 240 may be corrected to the tooth profile for meshing with the planetary gear 220 simultaneously with the fixed annular gear 230 in the same manner as described above.

Figure 10:
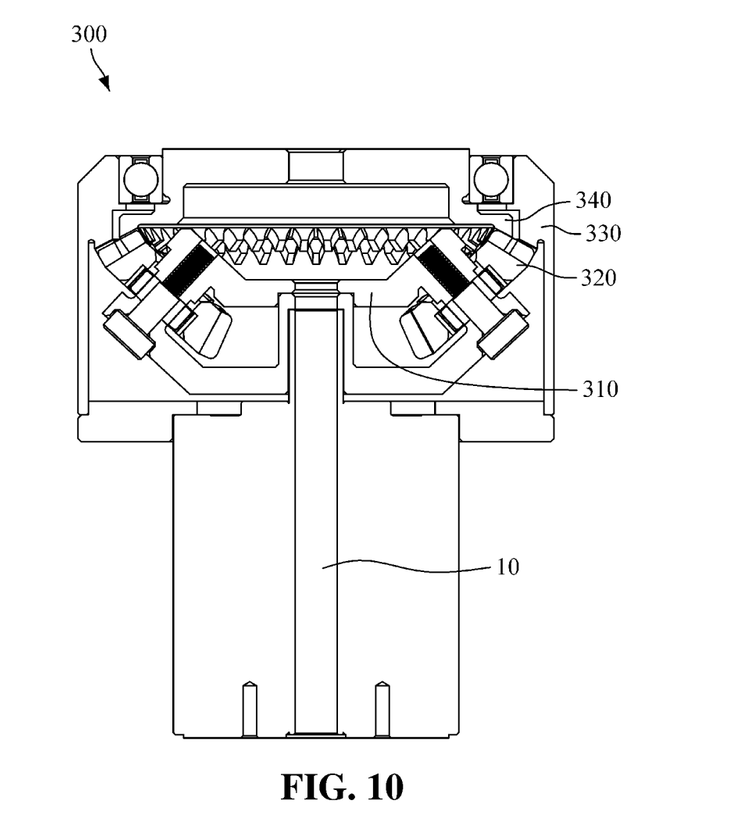
FIG. 10 is a cross-sectional view of a high-ratio differential reducer according to another embodiment of the present invention.
Figure 11:
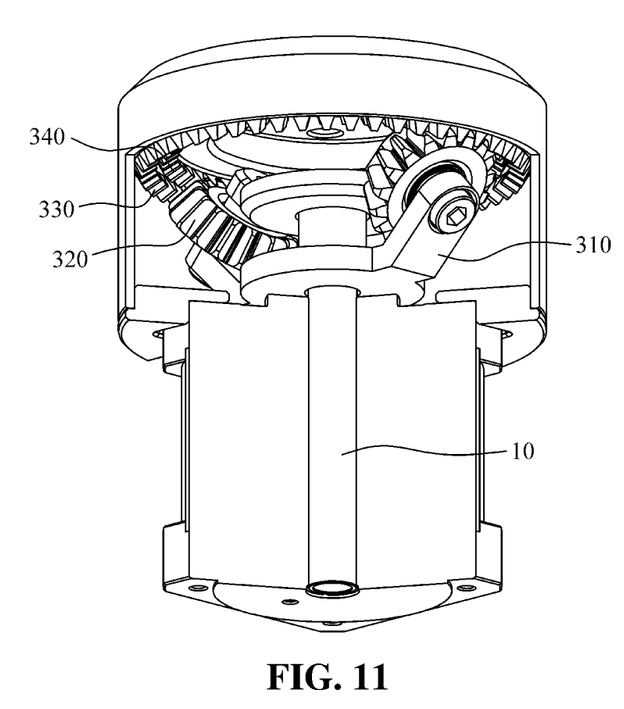
FIG. 11 is a perspective view of FIG. 10.

FIG. 10 is a cross-sectional view of a high-ratio differential reducer according to another embodiment of the present invention. FIG. 11 is a perspective view of FIG. 10.

Referring to FIGS. 10 and 11, in the high-ratio differential reducer 300 according to another embodiment of the present invention, a planetary gear 320, a fixed annular gear 330, and a rotating annular gear 340 may also each be composed of a bevel gear. However, an axis of rotation of the planetary gear 320 is disposed to be inclined with respect to an input shaft 10 of a carrier 310. The fixed annular gear 330 and the rotating annular gear 340 may be made simultaneously mesh with the planetary gear 320 according to the arrangement relationship with the planetary gear 320. The tooth profile of the rotating annular gear 340 may be corrected to a tooth profile for meshing with the planetary gear 320 simultaneously with the fixed annular gear 330 in the same manner as that in the above-described embodiment.

As described in the above embodiments, when in the high-ratio differential reducers 200 and 300, the planetary gears 220 and 320, the fixed annular gears 230 and 330, and the rotating annular gears 240 and 340 are each composed of a bevel gear, the shape of gears may be easily manufactured using molds by injection molding, sintering, or the like.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A high-ratio differential reducer comprising:
a carrier connected to an input shaft; at least one planetary gear which is rotatably supported by the carrier in an eccentric state from the carrier;
a fixed annular gear meshing with the planetary gear in a state of being coaxially arranged with the carrier;
a rotating annular gear meshing with the planetary gear in a state of being coaxially arranged with the fixed annular gear and having the number of teeth that is set by Equation 1 below:

$$Z_o = Z_f \pm N_p \qquad (1),$$

where $Z_o$ is the number of teeth of the rotating annular gear, $Z_f$ is the number of teeth of the fixed annular gear, and $N_p$ is the number of planetary gears,
wherein a module and a pressure angle of the rotating annular gear are obtained by Equations 2 and 3 below:

$$m_o = m_s \left( \frac{Z_f - Z_p}{Z_o - Z_p} \right), \qquad (2)$$

where $m_o$ is a module of the rotating annular gear, $m_s$ is a module of the fixed annular gear, and $Z_o$ is the number of teeth of the planetary gear, and $$\alpha_o = a\cos\left( \frac{Z_o - Z_p}{Z_f - Z_p} \cos\alpha_s \right), \qquad (3)$$

where $\alpha_o$ is a pressure angle of the rotating annular gear and $\alpha_s$ is a pressure angle of the fixed annular gear.

2. The high-ratio differential reducer of claim 1, wherein under condition in which the module, the pressure angle, and a profile shift coefficient of the planetary gear are $m_o$, $\alpha_o$, and $x_p$, respectively, the profile shift coefficient of the planetary gear is obtained by Equation 4 below:

$$x_p = \frac{Z_p}{2\tan(\alpha_o)} (inv\alpha_s - inv\alpha_o), \qquad (4)$$

where $inv\ \alpha_s = \tan\alpha_s - \alpha_s$ and $inv\ \alpha_o = \tan\alpha_o - \alpha_o$.

3. The high-ratio differential reducer of claim 2, wherein a profile shift coefficient of the rotating annular gear is obtained by substituting the module and the pressure angle of the rotating annular gear, the profile shift coefficient of the planetary gear, and a preset normal backlash into Equation 5 below, under conditions in which a working pressure angle of the rotating annular gear and the planetary gear is equal to the pressure angle of the rotating annular gear:

$$x_o = -\frac{f_n}{2m_o \sin\alpha_o} - x_p, \qquad (5)$$

where $x_o$ is the profile shift coefficient of the rotating annular gear and $f_n$ is the normal is backlash.

4. The high-ratio differential reducer of claim 1, wherein the planetary gear, the fixed annular gear, and the rotating annular gear are each composed of a spur gear.

5. The high-ratio differential reducer of claim 1, wherein the planetary gear, the fixed annular gear, and the rotating annular gear are each composed of a helical gear.

6. The high-ratio differential reducer of claim 1, wherein the planetary gear, the fixed annular gear, and the rotating annular gear are each composed of a bevel gear.

\* \* \* \* \*